United States Patent
Ito et al.

(10) Patent No.: US 8,415,008 B2
(45) Date of Patent: Apr. 9, 2013

(54) RESIN COMPOSITION, AND MOLDED ARTICLE PRODUCED FROM THE SAME

(75) Inventors: Akira Ito, Uji (JP); Kazue Ueda, Uji (JP); Tatsuya Matsumoto, Osaka (JP); Tatsunori Masaki, Uji (JP); Kiyohiko Yamamura, Uji (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 12/449,538

(22) PCT Filed: Feb. 19, 2008

(86) PCT No.: PCT/JP2008/000252
§ 371 (c)(1), (2), (4) Date: Aug. 11, 2009

(87) PCT Pub. No.: WO2008/102536
PCT Pub. Date: Aug. 28, 2008

(65) Prior Publication Data
US 2010/0028657 A1    Feb. 4, 2010

(30) Foreign Application Priority Data

Feb. 23, 2007 (JP) ................................. 2007-043984
May 24, 2007 (JP) ................................. 2007-137924

(51) Int. Cl.
*B32B 5/16* (2006.01)
*C08L 33/12* (2006.01)
*C08L 51/08* (2006.01)
*C08L 69/00* (2006.01)

(52) U.S. Cl.
USPC ......................................................... 428/327

(58) Field of Classification Search ........................ None
See application file for complete search history.

(56) References Cited

U.S. PATENT DOCUMENTS 5,952,450 A * 9/1999 Ishihara et al. ............... 528/196
2008/0071038 A1   3/2008 Ido

FOREIGN PATENT DOCUMENTS

| | | |
|---|---|---|
| EP | 1792941 | 6/2007 |
| JP | 7-109413 | 4/1995 |
| JP | 2006-111858 | 4/2006 |
| JP | 2006-182994 | 7/2006 |
| JP | 2006-241209 | 9/2006 |
| WO | 2005/075564 | 8/2005 |
| WO | 2006/097979 | 9/2006 |

* cited by examiner

*Primary Examiner* — Monique Jackson
(74) *Attorney, Agent, or Firm* — Fildes & Outland, P.C.

(57) ABSTRACT

Disclosed is a resin composition including a polylactic acid resin (A) and a polycarbonate resin (B) and a molded article produced by molding the resin composition. The mass ratio (A/B) between the resins (A) and (B) is 40/60 to 80/20. The ratio ($MFR_A/MFR_B$) between the melt flow rate ($MFR_A$) of the polylactic acid resin (A) and the melt flow rate ($MFR_B$) of the polycarbonate resin (B) at 240° C. under a load of 21.2 N is 20 to 600. The polycarbonate resin (B) is particle-dispersed in island shapes in the polylactic acid resin (A) in a range from a surface of the molded article to a depth of 5 μm and lengths of cross sections of dispersed particles observed in a cross section of the molded article are 0.1 μm or more.

3 Claims, 1 Drawing Sheet

RESIN COMPOSITION, AND MOLDED ARTICLE PRODUCED FROM THE SAME

TECHNICAL FIELD

The present invention relates to a resin composition and a molded article produced from the same, in particular, a resin composition including a polylactic acid resin and a polycarbonate resin, and a molded article produced from the same.

BACKGROUND ART

In these years, due to the high concern about the environmental issues, various biodegradable aliphatic polyesters typified by polylactic acid are attracting attention.

Polylactic acid is a resin relatively high in melting point, but the glass transition temperature (Tg) thereof is low. Therefore, the injection molding of polylactic acid are unfortunately limited in the operation conditions such as the die temperature and the molding cycle time, for the purpose of controlling the crystallinity of polylactic acid. Therefore, the development of the heat resistance of polylactic acid involves technical constraints. Additionally, the impact resistance and the durability (hydrolysis resistance) of polylactic acid are far from being sufficient.

The biodegradable aliphatic polyesters other than polylactic acid, such as polyethylene succinate, polybutylene succinate and polyglycolic acid are also far from being sufficient in heat resistance, impact resistance and durability.

As described above, the biodegradable aliphatic polyesters are limited in physical properties and productivity when used as molding materials. Hence, it has come to be considered that the biodegradable aliphatic polyesters can hardly be used each alone.

On the other hand, the following viewpoint has come to be widespread: even the improvement of the performances of biodegradable aliphatic polyesters by mixing non-biodegradable resins therewith is favorable to the environment if the biodegradable resins originate from plants just like polylactic acid, because the wide use of such biodegradable resins reduces the use of the resins originating from petroleum and consequently contributes to the saving of the petroleum resources.

For the purpose of compensating such aforementioned deficient performances of the biodegradable aliphatic polyester resins, alloys of such polyester resins with polycarbonate resins that are excellent in heat resistance and impact resistance have been proposed.

For example, JP-7-109413A discloses a resin composition including a polylactic acid resin and an aromatic polycarbonate resin. The resin composition is improved with respect to the heat resistance and the impact resistance to a practical level as compared to polylactic acid alone. However, the material obtained from the resin composition has pearlescence and hence does not provide uniform exterior appearance, and hence unfortunately the scope of use thereof is limited.

JP-2005-048067A discloses that in a resin composition including a polycarbonate resin and a polylactic acid, the impact resistance thereof is improved and the pearlescence thereof is diminished by mixing an impact improver such as a core-shell graft polymer in the resin composition. However, the improvement effect of the exterior appearance attained herewith is not sufficiently satisfactory.

DISCLOSURE OF THE INVENTION

Problems to be Solved by the Invention

The present invention solves the above-described problems, and takes as its subject the provision of a resin composition that is low in the degree of dependence on the petroleum-originating products, and excellent in surface exterior appearance as well as heat resistance, impact resistance and durability, and the provision of a molded article produced from the resin composition.

Means for Solving the Problems

The present inventors diligently conducted a great deal of study for the purpose of solving the above-described problems, and consequently, have reached the present invention by discovering that the above-described problems are solved by addition of a methyl methacrylate copolymer to a resin composition including a polylactic acid resin and a polycarbonate resin wherein the melt viscosity ratio between these two resins is specified.

Specifically, the gist of the present invention is as follows.

(1) A resin composition including a polylactic acid resin (A), a polycarbonate resin (B) and a methyl methacrylate copolymer (C), wherein: the mass ratio (A/B) between the polylactic acid resin (A) and the polycarbonate resin (B) is 40/60 to 80/20; the ratio ($MFR_A/MFR_B$) between the melt flow rate ($MFR_A$) of the polylactic acid resin (A) and the melt flow rate ($MFR_B$) of the polycarbonate resin (B) at 240° C. under a load of 21.2 N is less than 10; the methyl methacrylate copolymer (C) is a copolymer between methyl methacrylate and (meth)acrylic acid ester; the weight average molecular weight (Mw) of the methyl methacrylate copolymer (C) is 500,000 or more; and the content of the methyl methacrylate copolymer (C) is 0.1 to 20 parts by mass in relation to 100 parts by mass of the total of the polylactic acid resin (A) and the polycarbonate resin (B)

(2) The resin composition according to (1), wherein the methyl methacrylate copolymer (C) is a copolymer between methyl methacrylate and butyl acrylate.

(3) The resin composition according to (1) or (2), wherein the resin composition includes an epoxy group-containing additive (D) and the content of the epoxy group-containing additive (D) is 0.5 to 30 parts by mass in relation to 100 parts by mass of the total of the polylactic acid resin (A) and the polycarbonate resin (B).

(4) The resin composition according to any one of (1) to (3), wherein the resin composition includes a reactive compound (E) that includes at least one or more units of a functional group selected from the group consisting of carbodiimide, epoxy and oxazoline, and the content of the reactive compound (E) is 0.01 to 5 parts by mass in relation to 100 parts by mass of the total of the polylactic acid resin (A) and the polycarbonate resin (B).

(5) The resin composition according to any one of (1) to (4), wherein the resin composition includes a core-shell graft copolymer (F) and the content of the core-shell graft copolymer (F) is 0.1 to 30 parts by mass in relation to 100 parts by mass of the total of the polylactic acid resin (A) and the polycarbonate resin (B).

(6) A molded article produced by molding the resin composition according to any one of (1) to (5).

(7) A resin composition including a polylactic acid resin (A) and a polycarbonate resin (B), wherein: the mass ratio (A/B) between the polylactic acid resin (A) and the polycarbonate resin (B) is 40/60 to 80/20; and the ratio ($MFR_A/$ $MFR_B$) between the melt flow rate ($MFR_A$) of the polylactic acid resin (A) and the melt flow rate ($MFR_B$) of the polycarbonate resin (B) at 240° C. under a load of 21.2 N is 10 or more.

(8) The resin composition according to (7), wherein the resin composition includes an epoxy group-containing additive (D) and the content of the epoxy group-containing additive (D) is 0.5 to 30 parts by mass in relation to 100 parts by mass of the total of the polylactic acid resin (A) and the polycarbonate resin (B).

(9) The resin composition according to (7), wherein the resin composition includes a reactive compound (E) that includes at least one or more units of a functional group selected from the group consisting of carbodiimide, epoxy and oxazoline, and the content of the reactive compound (E) is 0.01 to 5 parts by mass in relation to 100 parts by mass of the total of the polylactic acid resin (A) and the polycarbonate resin (B).

(10) A molded article produced by molding the resin composition according to any one of above-described (7) to (9), wherein: the polycarbonate resin (B) is particle-dispersed in island shapes in the polylactic acid resin (A), in a range from the surface of the molded article to a depth of 5 μm; and the lengths of the cross sections of the dispersed particles observed in the cross section of the molded article are 0.1 μm or more.

Advantages of the Invention

According to the present invention, a resin composition can be obtained which is low in the degree of dependence on the petroleum-originating products, and excellent in exterior appearance as well as heat resistance, impact resistance and durability. The resin composition can be preferably used as various molded articles in various applications.

BEST MODE FOR CARRYING OUT THE INVENTION

Hereinafter, the present invention is described in detail.

A first aspect of the resin composition of the present invention is a resin composition including a polylactic acid resin (A), a polycarbonate resin (B) and a methyl methacrylate copolymer (C), wherein: the mass ratio (A/B) between the polylactic acid resin (A) and the polycarbonate resin (B) is 40/60 to 80/20; the ratio ($MFR_A/MFR_B$) between the melt flow rate ($MFR_A$) of the polylactic acid resin (A) and the melt flow rate ($MFR_B$) of the polycarbonate resin (B) at 240° C. under a load of 21.2 N is less than 10; the methyl methacrylate copolymer (C) is a copolymer between methyl methacrylate and (meth)acrylic acid ester; the weight average molecular weight (Mw) of the methyl methacrylate copolymer (C) is 500,000 or more; and the content of the methyl methacrylate copolymer (C) is 0.1 to 20 parts by mass in relation to 100 parts by mass of the total of the polylactic acid resin (A) and the polycarbonate resin (B).

A second aspect of the resin composition of the present invention is a resin composition including a polylactic acid resin (A) and a polycarbonate resin (B), wherein: the mass ratio (A/B) between the polylactic acid resin (A) and the polycarbonate resin (B) is 40/60 to 80/20; and the ratio ($MFR_A/MFR_B$) between the melt flow rate ($MFR_A$) of the polylactic acid resin (A) and the melt flow rate ($MFR_B$) of the polycarbonate resin (B) at 240° C. under a load of 21.2 N is 10 or more.

Examples of the polylactic acid resin (A) used in the resin composition of the present invention include poly(L-lactic acid), poly(D-lactic acid), a mixture of these, a copolymer of these and a stereo-complex of these. The polylactic acid resin (A) is produced by a known melt polymerization method, or by further using in combination, where necessary, a solid-phase polymerization method. Alternatively, if other polyesters such as polyglycolic acid, polycaprolactone, polybutylene succinate and polyethylene succinate are used in small amounts, the mixtures or the copolymers with these other polyesters may also be used. However, the polylactic acid resin (A) is preferably a material mainly composed of poly (L-lactic acid), from the viewpoint of the mechanical strength and the heat resistance.

The melting point of the polylactic acid mainly composed of poly(L-lactic acid) is varied depending on the optical purity thereof. In the present invention, in view of the mechanical strength and the heat resistance of the molded article, the melting point of the polylactic acid is preferably 160° C. or higher. For the purpose of setting the melting point of the polylactic acid mainly composed of poly(L-lactic acid) at 160° C. or higher, the proportion of the D-lactic acid component has only to be set at about less than 3 mol %.

In the polylactic acid (A) used in the present invention, a crosslinked structure or a branched structure may be present as introduced thereinto. Examples of the method for introducing the crosslinked structure or the branched structure include a method in which an organic peroxide is added, a method in which an organic peroxide and a radical polymerizable compound are used in combination, a method in which irradiation with radioactive rays is conducted and a method in which the production is conducted in the presence of a multifunctional initiator.

Examples of the peroxide include dibutyl peroxide and bis(butyl peroxy) diisopropylbenzene. Examples of the radical polymerizable compound include glycidyl methacrylate, ethylene glycol dimethacrylate, diethylene glycol dimethacrylate and polyethylene glycol dimethacrylate. Examples of the multifunctional initiator include ethylene-vinyl alcohol copolymer, partially saponified polyvinyl alcohol and cellulose diacetate.

The molecular weight of the polylactic acid resin (A) used in the resin composition of the present invention is not particularly limited; however, if the melt flow rate (MFR) at 240° C. under a load of 21.2 N to serve as an index for the molecular weight falls within a range from 1 to 300 g/10 min, the resin (A) can be used satisfactorily. The melt flow rate is more preferably within a range from 5 to 250 g/10 min. When the melt flow rate exceeds 300 g/10 min, the melt viscosity is too low and accordingly the mechanical strength and the heat resistance of the molded article may be poor. On the other hand, when the melt flow rate is less than 1 g/10 min, the load at the time of molding is too high, and hence the operability may be degraded.

The polycarbonate resin (B) used in the resin composition of the present invention includes a bisphenol residue unit and carbonate residue unit.

Examples of the bisphenols include 2,2-bis(4-hydroxyphenyl)propane, 2,2-bis(3,5-dibromo-4-hydroxyphenyl)propane, 2,2-bis(3,5-dimethyl-4-hydroxyphenyl)propane, 1,1- bis(4-hydroxyphenyl)cyclohexane, 1,1-bis(3,5-dimethyl-4-hydroxyphenyl)cyclohexane, 1,1-bis(4-hydroxyphenyl)decane, 1,4-bis(4-hydroxyphenyl)propane, 1,1-bis(4-hydroxyphenyl)cyclododecane, 4,4'-dihydroxydiphenyl ether, 4,4'-dithiodiphenol, 4,4'-dihyroxy-3,3'-dichlorodiphenyl ether and 4,4'-dihydroxy-2,5-dihydroxydiphenyl ether. In addition to these, the diphenols described in U.S. Pat. Nos. 2,999,835, 3,028,365, 3,334,154 and 4,131,575 can be used. These may be used each alone or as mixtures of two or more thereof.

Examples of the precursor for introducing a carbonate residue unit include phosgene and diphenyl carbonate.

The intrinsic viscosity of the polycarbonate resin used in the present invention preferably falls within a range from 0.30 to 0.64. When the intrinsic viscosity exceeds 0.64, the melt viscosity of the resin composition comes to be high, and kneading extrusion and injection molding tend to be difficult. When the intrinsic viscosity is less than 0.30, the impact strength of the produced molded article tends to be insufficient.

In the resin composition of the present invention, the mass ratio (A/B) between the polylactic acid resin (A) and polycarbonate resin (B) is required to be 40/60 to 80/20, and is preferably 50/50 to 75/25 and more preferably 55/45 to 70/30. When the mass proportion of the polylactic acid resin (A) is less than 40%, the proportion of the natural product-derived material comes to be small and the resin composition of the present invention is hardly said to contribute to the saving of the exhaustible resources such as petroleum. On the contrary, when the proportion of the polylactic acid resin (A) exceeds 80% by mass, the physical properties of the obtained resin composition such as heat resistance and the impact resistance come to be insufficient.

In the first aspect that includes the methyl methacrylate copolymer (C) in the resin composition of the present invention, the ratio ($MFR_A/MFR_B$) between the melt flow rate ($MFR_A$) of the polylactic acid resin (A) at 240° C. under a load of 21.2 N and the melt flow rate ($MFR_B$) of the polycarbonate resin (B) under the same conditions is required to be less than 10, and is preferably 8 or less and more preferably 5 or less. In the first aspect, when the MFR ratio ($MFR_A/MFR_B$) is 10 or more, the physical properties such as the heat resistance and impact resistance are degraded.

In the second aspect that does not include the methyl methacrylate copolymer (C) in the resin composition of the present invention, the ratio ($MFR_A/MFR_B$) between the melt flow rate ($MFR_A$) of the polylactic acid resin (A) at 240° C. under a load of 21.2 N and the melt flow rate ($MFR_B$) of the polycarbonate resin (B) under the same conditions is required to be 10 or more, and is preferably 20 or more and more preferably 40 or more. In the second aspect, when the MFR ratio ($MFR_A/MFR_B$) is less than 10, pearlescence is developed to deteriorate the exterior appearance. It is to be noted that the MFR ratio ($MFR_A/MFR_B$) is preferably 600 or less. When the MFR ratio exceeds 600, the physical properties such as the heat resistance and impact resistance may be degraded.

In the present invention, the adoption of the melt flow rate measurement temperature of 240° C. is based on the reason that this temperature is close to the temperature of the melt-kneading of the polylactic acid resin (A) and the polycarbonate resin (B) in the production of the resin composition of the present invention.

The methyl methacrylate copolymer (C) used in the resin composition of the present invention is a copolymer between methyl methacrylate and a (meth)acrylic acid ester. Specifically, the copolymer (C) is a copolymer obtained by copolymerizing a monomer mixture composed of methyl methacrylate and acrylic acid ester or a monomer mixture composed of methyl methacrylate and a methacrylic acid ester other than methyl methacrylate.

Preferable as the acrylic acid ester is an acrylic acid ester having an alkyl group having 1 to 18 carbon atoms. The alkyl group of such an acrylic acid ester may be linear, branched or cyclic. Specific examples of the acrylic acid ester having a linear alkyl group include methyl acrylate, ethyl acrylate, n-butyl acrylate, lauryl acrylate and stearyl acrylate. Specific examples of the acrylic acid ester having a branched alkyl group include 2-ethylhexyl acrylate. Specific examples of the acrylic acid ester having a cyclic alkyl group include cyclohexyl acrylate. When the number of the carbon atoms in the alkyl group exceeds 18, the polymerizability of the monomer is degraded and the copolymerization may come to be difficult.

Preferable as the methacrylic acid ester other than methyl methacrylate is a methacrylic acid ester having an alkyl group having 2 to 18 carbon atoms. The alkyl group of such a methacrylic acid ester may be linear, branched or cyclic. Specific examples of the methacrylic acid ester having a linear alkyl group include ethyl methacrylate, n-butyl methacrylate, lauryl methacrylate, stearyl methacrylate and tridecyl methacrylate. Specific examples of the methacrylic acid ester having a branched alkyl group include i-butyl methacrylate, t-butyl methacrylate and 2-ethylhexyl methacrylate. Specific examples of the methacrylic acid ester having a cyclic alkyl group include cyclohexyl methacrylate. When the number of the carbon atoms in the alkyl group exceeds 18, the polymerizability of the monomer is degraded and the copolymerization may come to be difficult.

The proportion of the methyl methacrylate component in the monomer components constituting the copolymer (C) is preferably 70 to 90% by mass and more preferably 80 to 90% by mass. When the proportion falls outside these ranges, there is a possibility that the exterior appearance improvement effect is not attained to a sufficient extent.

In the copolymer (C), as long as the properties of the copolymer (C) are not significantly impaired, other types of monomers may be copolymerized. Examples of the other types of monomers include: aromatic alkenyl compounds such as styrene, α-methylstyrene, chlorostyrene and vinyltoluene; vinyl cyanide compounds such as acrylonitrile and methacrylonitrile; vinyl esters such as vinyl acetate; dicarboxylic acid anhydrides such as maleic anhydride; and further, multifunctional monomers such as divinylbenzene and allyl methacrylate. In the present invention, according to the purposes, these may be used each alone or in combinations of two or more thereof.

The weight average molecular weight (Mw) of the copolymer (C) measured by gel permeation chromatography with tetrahydrofuran as an elution solvent and determined relative to polystyrene standards is required to be 500,000 or more, and is preferably 800,000 or more. When the weight average molecular weight (Mw) of the copolymer (C) is less than 500,000, the exterior appearance improvement effect is not attained to a sufficient extent.

Examples of the polymerization method for obtaining the copolymer (C) include an emulsion polymerization method, a suspension polymerization method and a solution polymerization method. Most preferable among these is the emulsion polymerization method.

In the resin composition of the present invention, the content of the copolymer (C) is required to be 0.1 to 20 parts by mass, and preferably 1 to 10 parts by mass and furthermore preferably 2 to 5 parts by mass in relation to 100 parts by mass of the total of the polylactic acid resin (A) and the polycarbonate resin (B). When the content of the copolymer (C) is less than 0.1 part by mass, the exterior appearance improvement effect is not sufficient, and when the content of the copolymer (C) exceeds 20 parts by mass, the heat resistance is degraded.

The resin composition of the present invention may include an epoxy group-containing additive (D) for the purpose of promoting the compatibilization between the polylactic acid resin (A) and the polycarbonate resin (B). The epoxy group-containing additive (D) is not particularly limited as long as the additive (D) contains one or more epoxy groups; however, preferable are polymer compounds obtained by graft polymerization or copolymerization of epoxy compounds.

Examples of the polymer compounds obtained by graft polymerization (hereinafter, represented by "-g-") or copolymerization (hereinafter, represented by "/") of epoxy compounds include ethylene/glycidyl methacrylate copolymer, ethylene/glycidyl methacrylate/vinyl acetate copolymer, ethylene/glycidyl methacrylate/methyl acrylate copolymer, ethylene/glycidyl methacrylate copolymer-g-polymethyl methacrylate, ethylene/glycidyl methacrylate copolymer-g-acrylonitrile/styrene copolymer, and ethylene/glycidyl methacrylate copolymer-g-polystyrene.

The content of the epoxy group-containing additive (D) is preferably 0.5 to 30 parts by mass, more preferably 1 to 20 parts by mass and furthermore preferably 3 to 15 parts by mass in relation to 100 parts by mass of the total of the polylactic acid resin (A) and the polycarbonate resin (B). When the content is less than 0.5 part by mass, the compatibilization effect between the polylactic acid resin (A) and the polycarbonate resin (B) is insufficient. When the content exceeds 30 parts by mass, the heat resistance tends to be degraded.

For the purpose of improving the humidity-heat resistance by blocking the terminal groups of the polylactic acid resin (A), the resin composition of the present invention may include a reactive compound (E) that includes at least one or more units of a functional group selected from the group consisting of carbodiimide, epoxy and oxazoline. Preferable among these is a carbodiimide compound.

Specific examples of the carbodiimide compound include: N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolylcarbodiimide, p-phenylene-bis-dicyclohexylcarbodiimide, hexamethylene-bis-dicyclohexylcarbodiimide, 4,4'-dicyclohexylmethanecarbodiimide, ethylene-bis-diphenylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, t-butylisopropylcarbodiimide, di-β-naphthylcarbodiimide, di-t-butylcarbodiimide, and aromatic polycarbodiimides; and further include polymers of these compounds. These carbodiimide compounds may be used each alone or in combinations of two or more thereof. In the present invention, aromatic carbodiimides, in particular, N,N'-di-2,6-diisopropylphenylcarbodiimide and the polymers of these compounds are preferably used. In addition to these, carbodiimide compounds having one or more cyclo-rings, in particular, 4,4'-dicyclohexylmethanecarbodiimide and the polymers of these compounds are particularly preferably used.

Specific examples of the epoxy compound include ethylene glycol diglycidyl ether, polyethylene glycol diglycidyl ether, propylene glycol diglycidyl ether, polypropylene glycol diglycidyl ether, polybutadiene diglycidyl ether, neopentyl glycol diglycidyl ether, 1,6-hexanediol diglycidyl ether, cyclohexanedimethanol diglycidyl ether, hydroquinone diglycidyl ether, N-glycidyl phthalimide, hydrogenated bisphenol A-diglycidyl ether, sorbitol polyglycidyl ether, pentaerythritol polyglycidyl ether, glycerol polyglycidyl ether, polyglycerol polyglycidyl ether, trimethylpropane polyglycidyl ether, 2-ethylhexyl glycidyl ether, phenyl glycidyl ether, phenyl(polyethylene glycol) glycidyl ether, phenyl(polypropylene glycol) glycidyl ether, p-tert-butylphenyl glycidyl ether, diglycidyl-o-phthalate, diglycidyl terephthalate, dibromophenyl glycidyl ether, and epoxidized vegetable oils. These epoxy compounds may be used each alone or in combinations of two or more thereof. Particularly preferable among these is ethylene glycol diglycidyl ether or polyethylene glycol diglycidyl ether.

Specific examples of the oxazoline compound include monooxazoline compounds such as 2-methyl-2-oxazoline, 2-ethyl-2-oxazoline, 2-phenyl-2-oxazoline, 2-isopropenyl-2-oxazoline and 2,4-dimethyl-2-oxazoline; bisoxazoline compounds such as 2,2'-(1,3-phenylene) bis(2-oxazoline); and polymers having oxazoline groups on the side chains thereof. These oxazoline compounds may be used each alone or in combinations of two or more thereof. Particularly preferable among these is 2,21-(1,3-phenylene) bis(2-oxazoline).

The content of the reactive compound (E) is preferably 0.01 to 5 parts by mass and more preferably 0.1 to 3 parts by mass in relation to 100 parts by mass of the total of the polylactic acid resin (A) and the polycarbonate resin (B). When the content is less than 0.01 part by mass, no substantial effect to improve the humidity-heat resistance tends to occur. On the other hand, when the content exceeds 5 parts by mass, the heat resistance tends to be degraded.

The resin composition of the present invention may include a core-shell graft copolymer (F) for the purpose of improving the impact resistance of the polylactic acid resin (A) and the polycarbonate resin (B). The core-shell graft copolymer (F) as referred to herein means a graft copolymer in which the core is formed of a polymer component having rubber elasticity and the shell is formed of a polymer component having thermoplasticity.

The type of the rubbery component of the graft copolymer is not particularly limited; the rubbery component has only to be composed of a polymer component having rubber elasticity. Examples of such a rubbery component include rubbers composed of polymers obtained by polymerization of components such as an acrylic component, a silicone component, s styrene component, a nitrile component, a conjugated diene component, a urethane component and an ethylene-propylene component.

Examples of the acrylic component include an ethyl acrylate unit and a butyl acrylate unit; examples of the silicone component include a dimethylsiloxane unit and a phenylmethylsiloxane unit; examples of the styrene component include a styrene unit and an α-methylstyrene unit; examples of the nitrile component include an acrylonitrile unit and a methacrylonitrile unit; and examples of the conjugated diene component include a butadiene unit and an isoprene unit.

Also preferable are the rubbers composed of the copolymers obtained by copolymerizing combinations of two or more types of these components. Examples of such rubbers include: (1) a rubber composed of the components obtained by copolymerizing and hybridizing the acrylic component and the silicone component; (2) a rubber composed of the components obtained by copolymerizing the acrylic component and the styrene component; (3) a rubber composed of the components obtained by copolymerizing the acrylic component and the conjugated diene component; and (4) a rubber composed of the components obtained by polymerizing the acrylic component, the silicone component and the styrene component. Also preferable are the rubbers obtained by copolymerizing and crosslinking, in addition to these components, the crosslinking components such as a divinylbenzene unit, an allyl acrylate unit or a butylene glycol diacrylate unit.

In the present invention, the rubber components constituting the core-shell graft copolymer (F) are preferably a butadiene rubber, an acrylic rubber, a silicone rubber and a silicone/acrylic rubber.

The butadiene rubber is a polymer composed of only an 1,3-butadiene monomer unit, or a polymer composed of the 1,3-butadiene monomer unit and the one or more types of vinyl monomer units copolymerizable with the 1,3-butadiene monomer unit. The content of the copolymerizable one or more types of vinyl monomer units is preferably 50% by mass or less in the butadiene rubber polymer.

Examples of the vinyl monomer copolymerizable with 1,3-butadiene include: aromatic vinyl compounds such as styrene and α-methylstyrene; methacrylic acid alkyl esters such as methyl methacrylate and ethyl methacrylate; acrylic acid alkyl esters such as ethyl acrylate and n-butyl acrylate; unsaturated nitriles such as acrylonitrile and methacrylonitrile; vinyl ethers such as methyl vinyl ether and butyl vinyl ether; vinyl halides such as vinyl chloride and vinyl bromide; vinylidene halides such as vinylidene chloride and vinylidene bromide; and glycidyl group-containing vinyl monomers such as glycidyl acrylate, glycidyl methacrylate, allyl glycidyl ether and ethylene glycol glycidyl ether.

Additionally, examples of the usable copolymerizable vinyl monomers other than the above-described monomers include: aromatic multifunctional vinyl compounds such as divinylbenzene and divinyltoluene; polyhydric alcohols such as ethylene glycol dimethacrylate and 1,3-butanediol diacrylate; carboxylic acid allyl esters such as trimethacrylic acid ester, triacrylic acid ester, allyl acrylate and allyl methacrylate; diallyl compounds such as diallyl phthalate and diallyl sebacate; and crosslinking monomers (crosslinking agents) such as triallyl compounds such as triallyltriazine. These may be used each alone or as mixtures of two or more thereof.

Examples of the acrylic rubber include an acrylic rubber composed of an acrylic acid ester as the main constituent unit in an amount of 50 to 100% by mass and a vinyl monomer copolymerizable with the acrylic acid ester in an amount of 50 to 0% by mass.

Examples of the acrylic acid ester constituting the acrylic rubber include acrylic acid alkyl esters in which the number of carbon atoms of the alkyl group is 2 to 8, such as ethyl acrylate, n-butyl acrylate and 2-ethylhexyl acrylate.

Examples of the vinyl monomer constituting the acrylic rubber include: aromatic vinyls such as styrene and α-methylstyrene; methacrylic acid alkyl esters such as methyl methacrylate and ethyl methacrylate; unsaturated nitriles such as acrylonitrile and methacrylonitrile; vinyl ethers such as methyl vinyl ether and butyl vinyl ether; vinyl halides such as vinyl chloride and vinyl bromide; vinylidene halides such as vinylidene chloride and vinylidene bromide; and glycidyl group-containing vinyl monomers such as glycidyl acrylate, glycidyl methacrylate, allyl glycidyl ether and ethylene glycol glycidyl ether.

Examples of the silicone/acrylic rubber include a rubber including a polyorganosiloxane and an alkyl (meth)acrylate rubber. This rubber may be produced by any method; however, the rubber produced by an emulsion polymerization method is most appropriate. The polyorganosiloxane is not particularly limited; however, preferable is a polyorganosiloxane that includes a vinyl polymerizable functional group.

Examples of the dimethylsiloxane used for production of the polyorganosiloxane include three- or higher-membered cyclic dimethylsiloxane compounds, and preferable are the three- to seven-membered cyclic dimethylsiloxane compounds. Specific examples of such cyclic dimethylsiloxane compounds include hexamethylcyclotrisiloxane, octamethylcyclotetrasiloxane, decamethylcyclopentasiloxane and dodecamethylcyclohexasiloxane; these are used each alone or as mixtures of two or more thereof.

On the other hand, the shell of the core-shell graft copolymer (F) is formed of a polymer component having thermoplasticity. The polymer component forming the shell preferably has a glass transition temperature higher than that of the polymer component forming the core.

Examples of the polymer forming the shell include polymers each including at least one or more types of units selected from an unsaturated carboxylic acid alkyl ester unit, a glycidyl group-containing vinyl unit, an aliphatic vinyl unit, an aromatic vinyl unit, a vinyl cyanide unit, a maleimide unit, an unsaturated dicarboxylic acid unit and other vinyl units. Preferable among such polymers are polymers each including an unsaturated carboxylic acid alkyl ester unit and/or a glycidyl group-containing vinyl unit.

The unsaturated carboxylic acid alkyl ester unit is not particularly limited; however, methacrylic acid alkyl esters are preferably used. Specific examples of the methacrylic acid alkyl esters include methyl methacrylate, ethyl methacrylate, n-propyl methacrylate, n-butyl methacrylate, t-butyl methacrylate, n-hexyl methacrylate, 2-ethylhexyl methacrylate, cyclohexyl methacrylate, stearyl methacrylate, octadecyl methacrylate, phenyl methacrylate, benzyl methacrylate, chloromethyl methacrylate, 2-chloroethyl methacrylate, 2-hydroxyethyl methacrylate, 3-hydroxypropyl methacrylate, 2,3,4,5,6-pentahydroxyhexyl methacrylate, 2,3,4,5-tetrahydroxypentyl methacrylate, aminoethyl acrylate, propylaminoethyl acrylate, dimethylaminoethyl methacrylate, ethylaminopropyl methacrylate, phenylaminoethyl methacrylate and cyclohexylaminoethyl methacrylate. From the viewpoint of the large effect of improving the dispersibility in a resin, among these, methyl methacrylate and n-butyl methacrylate can be preferably used. These units can be used each alone or in combinations of two or more thereof.

The glycidyl group-containing vinyl unit is not particularly limited; however, examples of the concerned vinyl unit include glycidyl methacrylate, glycidyl itaconate, diglycidyl itaconate, allyl glycidyl ether, styrene-4-glycidyl ether and 4-glycidylstyrene. From the viewpoint of the large effect of improving the impact resistance, among these, glycidyl methacrylate can be preferably used. These units can be used each alone or in combinations of two or more thereof.

Examples of the aliphatic vinyl unit may include ethylene, propylene and butadiene. Examples of the aromatic vinyl unit may include styrene, α-methylstyrene, 1-vinylnaphthalene, 4-methylstyrene, 4-propylstyrene, 4-cyclohexylstyrene, 4-dodecylstyrene, 2-ethyl-4-benzylstyrene, 4-(phenylbutyl) styrene and halogenated styrenes. Examples of the vinyl cyanide unit may include acrylonitrile, methacrylonitrile and ethacrylonitirle. Examples of the maleimide unit may include maleimide, N-methylmaleimide, N-ethylmaleimide, N-propylmaleimide, N-isopropylmaleimide, N-cyclohexylmaleimide, N-phenylmaleimide, N-(p-bromophenyl)maleimide and N-(chlorophenyl)maleimide. Examples of the unsaturated dicarboxylic acid unit may include maleic acid, maleic acid monoethyl ester, itaconic acid and phthalic acid. Examples of other vinyl units may include acrylamide, methacrylamide, N-methylacrylamide, butoxymethylacrylamide, N-propylmethacrylamide, N-vinyldiethylamine, N-acetylvinylamine, allylamine, methallylamine, N-methylallylamine, p-aminostyrene, 2-isopropenyl-oxazoline, 2-vinyl-oxazoline, 2-acryloyl-oxazoline and 2-styryl-oxazoline. These units can be used each alone or in combinations of two or more thereof.

The content of the core-shell graft copolymer (F) is preferably 0.1 to 30 parts by mass and more preferably 0.5 to 20 parts by mass in relation to 100 parts by mass of the total of the polylactic acid resin (A) and the polycarbonate resin (B). When the content is less than 0.1 part by mass, no improvement effect of the impact resistance is found. On the other hand, when the content exceeds 30 parts by mass, the heat resistance tends to be degraded.

Examples of the method for producing the resin composition of the present invention include a method in which the polylactic acid resin (A) and the polycarbonate resin (B) are melt-kneaded by using a common extruder. From the viewpoint of enhancing the mixing uniformity, it is preferable to use a double screw extruder.

When the copolymer (C), the epoxy group-containing additive (D), the reactive compound (E) and the core-shell graft copolymer (F) are included in the resin composition, examples of the adoptable method for adding these components include various methods such as a method in which these components are dry blended with the material for the resin and fed from a hopper, a method in which these components are added from a midway position of an extruder by using a feeder or the like, and a method in which these components are dissolved or dispersed in a liquid such as a plasticizer and the liquid is added.

In the resin composition of the present invention, glass fiber may be used for the purpose of improving the mechanical strength and the heat resistance. The mixing amount of the glass fiber is preferably 1 to 50 parts by mass in relation to 100 parts by mass of the resin composition. As the glass fiber, common glass fiber is sufficiently satisfactory. The glass fiber may be subjected to a surface treatment for the purpose of enhancing the adhesion to the resin. The addition method thereof may be such that, in an extruder, the glass fiber is added from a hopper or added by using a side feeder during kneading. Alternatively, if a masterbatch incorporating the glass fiber is prepared, the masterbatch may be used as diluted with a base resin at the time of molding.

In the resin composition of the present invention, as long as the properties thereof are not significantly impaired, the following may be added: a pigment, a heat stabilizer, an antioxidant, a weather-resistant agent, a flame retardant, a plasticizer, a lubricant, a release agent, an antistatic agent, a filler, a crystal nucleating agent and the like.

Examples of the heat stabilizer and the antioxidant include hindered phenols, phosphorus compounds, hindered amines, sulfur compounds, copper compounds and alkali metal halides.

Examples of the usable flame retardant include halogen flame retardants, phosphorus flame retardants and inorganic flame retardants. Among these, in consideration of the environment, it is preferable to use non-halogen flame retardants. Examples of the non-halogen flame retardants include phosphorus flame retardants, hydrated metal compounds (aluminum hydroxide, magnesium hydroxide), N-containing compounds (melamine compounds and guanidine compounds) and inorganic compounds (borates, Mo compounds).

Examples of the inorganic fillers include talc, calcium carbonate, zinc carbonate, wollastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolite, hydrotalcite, metal fiber, metal whisker, ceramic whisker, potassium titanate, boron nitride, graphite and carbon fiber.

Examples of the organic fillers include naturally-occurring polymers such as starch, cellulose fine particles, wood powder, bean curd refuse, rice hull and bran; and the modified products of these.

Examples of the inorganic crystal nucleating agents include talc and kaolin. Examples of the organic crystal nucleating agents include sorbitol compounds, benzoic acid and the metal salts of the compounds derived from benzoic acid, metal salts of phosphoric acid esters and rosin compounds.

The method for mixing these with the resin composition of the present invention is not particularly limited.

The resin composition of the present invention can be converted into various molded articles by the molding methods such as injection molding, blow molding, extrusion molding, inflation molding, and by the molding methods, applied after sheet formation, such as vacuum molding, pneumatic molding and vacuum pneumatic molding. In particular, the injection molding method is preferably adopted. In addition to common injection molding methods, a gas injection molding method, an injection press molding method and the like may also be adopted. To take an example, the injection molding conditions suitable for the resin composition of the present invention are such that the cylinder temperature is appropriately set at a temperature equal to or higher than the melting point or the flow initiation temperature of the polylactic acid resin (A), preferably set within a range from 180 to 260° C. and more preferably within a range from 190 to 250° C. When the molding temperature is too low, the operability tends to be unstable in such a way that short shot occurs in the molded article, and overloading tends to occur. On the other hand, when the molding temperature is too high, the resin composition is decomposed and a problem that the obtained molded article is degraded in strength or colored and other problems tend to occur.

The resin composition of the present invention can be enhanced in heat resistance by promoting the crystallization thereof. Examples of the method for that purpose include a method in which at the time of injection molding, cooling within the die promotes the crystallization of the polylactic acid resin component. In this case, preferably the die temperature is maintained at a temperature of the crystallization temperature of the polylactic acid resin component ±20° C. for a predetermined period of time, and thereafter cooled down to a temperature equal to or lower than the glass transition temperature of the polylactic acid resin component. Additionally, preferable examples of the method for promoting the crystallization after molding may include a method in which the molded article is cooled directly down to a temperature equal to or lower than the glass transition temperature of the polylactic acid resin component, and thereafter the molded article is heat-treated again at a temperature of the crystallization temperature of the polylactic acid resin component ±20° C.

In the second aspect of the present invention, the molded article is preferably such that the polycarbonate resin (B) is particle-dispersed in island shapes in the polylactic acid resin (A), in a range from the surface of the molded article to a depth of 5 µm, and the lengths of the cross sections of the dispersed particles observed in a cross section of the molded article are 0.1 µm or more. The lengths of the cross sections of the dispersed particles are more preferably 0.5 µm or more. In general, a plastic molded article has a surface layer portion called a skin layer and an inner layer portion called a core layer, located inner than the skin layer. The skin layer is formed by rapid charging and cooling of a high-temperature molten resin in the cold die, and is a portion tending to be oriented in the resin flow direction. Consequently, the island-like component is torn into smaller pieces in the surface layer portion of the molded article and is largely different in shape from the island-like component in the inner layer portion, as the case may be. Such structural non-uniformity between the surface layer portion and the inner layer portion is probably a cause to bring about the exterior appearance failure. Therefore, by controlling the shape of the island-like component, the exterior appearance failure of the molded article can be overcome. Specifically, when the methyl methacrylate copolymer (C) is not included, by setting at 10 or more the ratio ($MFR_A/MFR_B$) between the melt flow rate ($MFR_A$) of the polylactic acid resin (A) at 240° C. under a load of 21.2 N and the melt flow rate ($MFR_B$) of the polycarbonate resin (B) under the same conditions, the polycarbonate resin (B) is particle-dispersed in island shapes in the polylactic acid resin (A) in the range from the surface of the molded article to the depth of 5 µm, the lengths of the cross sections of the dispersed particles observed in a cross section of the molded article are 0.1 µm or more, and thus the exterior appearance of the molded article is improved. It is to be noted that the size of the polycarbonate resin (B) component in the molded article can be identified by observing the cross section of the molded article with a transmission electron microscope.

Examples of the molded article produced by using the resin composition of the present invention include the following. First, the resin composition is processed by an extrusion molding method into a sheet shape, a foamed sheet shape and a pipe shape, and these can be applied to cards such as credit cards, sheets laid under writing paper, transparent file holders, straws, agricultural, gardening and industrial rigid/soft pipes and pipe covers and the like. Further, by applying deep-draw molding such as vacuum molding, pneumatic molding or vacuum pneumatic molding or by applying blanking molding or the like to sheets, there can be produced food containers, agricultural, gardening and industrial containers, various sundry goods, blister pack containers, press-through pack containers, folding-type buffer materials, various building materials, various packings, partition plates and sign boards, bulletin boards, automobile interior materials, mannequins, shoe soles, hat brims and various interlinings.

The shape of the molded article produced by the injection molding method is not particularly limited. Specific examples of the shape include: eating utensils and related articles such as dishes, bowls, pots, chopsticks, spoons, forks, knives and trays; fluid containers (beverage cups and beverage bottles for dairy foods, soft drinks, alcoholic beverages and the like; temporary storage containers for seasonings such as soy sauce, sauce, mayonnaise, ketchup and cooking oil; containers for shampoo, rinse and the like; containers for cosmetic; containers for agricultural chemicals; and the like); caps for containers; office supplies such as rules, writing materials, transparent cases, CD cases and chairs; various storage containers such as containers; daily commodities such as sink-corner strainers, trashes, basins, toothbrushes, combs and clothes hangers; clothing-related articles such as fasteners and buttons; agricultural and gardening articles such as flower pots and seedling raising pots; various toys such as plastic models; resin components for use in electric appliances such as air conditioner panels, refrigerator trays, and various enclosures for personal computers, peripheral devices for personal computers, cellular phones, audio-video devices and the like; resin components for use in automobiles such as bumpers, instrument panels and door trims; fishing tools such as rods and lures; sporting goods such as various rackets and protectors; and various building materials.

The resin composition of the present invention and the molded article produced from the resin composition are excellent in exterior appearance, and hence will be able to be widely applied to those fields which have hitherto avoided the use of conventional resin compositions and conventional molded articles produced therefrom because of the exterior appearance failure thereof.

EXAMPLES

Hereinafter, the present invention is described more specifically with reference to Examples. However, the present invention is not limited only to below-described Examples.

The measurement methods used for the evaluation of below-described Examples and Comparative Examples are as follows.

(1) Melt Flow Rate (MFR)

The melt flow rate was measured according to JIS K7210, at 240° C. under a load of 21.2 N (2.16 kg). The unit is g/10 min.

(2) Intrinsic Viscosity (IV)

The intrinsic viscosity was measured by using a phenol/1, 1,2,2-tetrachloroethane mixed solvent (mass ratio: 6/4) at a temperature of 20° C.

(3) Molecular Weight

The molecular weight was determined relative to polystyrene standards by measuring at 40° C. by using a gel permeation chromatography (GPC) apparatus (manufactured by Shimadzu Corp.) equipped with a differential refractive index detector, and by using tetrahydrofuran as the eluent. Samples scarcely soluble in tetrahydrofuran were dissolved in a small amount of chloroform, and then measured as diluted with tetrahydrofuran.

(4) Deflection Temperature Under Load (DTUL)

The deflection temperature under load was measured according to ASTM Standard D-648 under a load of 0.45 MPa.

(5) IZOD Impact Strength

The Izod impact strength was measured according to ASTM Standard D-256, by using a specimen with a notch (V-shaped cut) formed therein.

(6) Flexural Modulus/Flexural Strength

The flexural modulus/flexural strength was measured according to ASTM Standard D-790 by applying a load at a deformation rate of 2 mm/min.

(7) Humidity-heat Resistance

The flexural strength test specimen used in the above-described (6) was treated in an atmosphere of a temperature of 60° C. and a humidity of 95% RH for 500 hours, and thereafter, the flexural strength of the specimen was measured and the strength retention rate was thereby evaluated.

(8) Exterior Appearance

The surface of an injection molded test specimen was visually observed. The case where the surface was free from the exterior appearance unevenness and free from defects was evaluated as good (G) and the case where exterior appearance unevenness was found was evaluated as poor (P).

(9) Observation of the Dispersed Particles of Polycarbonate Resin (B)

A test specimen prepared by injection molding was embedded in an epoxy resin, and the cross-sectional thin film samples of the injection molded specimen were prepared by using an ultra-microtome (Model "Ultracut N," manufactured by Reicher-Nissei Co.). For these samples, by using a transmission electron microscope (Model "JEM-200CX," manufactured by JEOL Ltd.), the images of the cross sections of the injection molded specimen from the surface layer portion of the injection molded specimen to a depth of 20 μm were obtained at a measurement magnification of 5000.

Evaluated as good (G) was the case where, the observation of these images revealed that the polycarbonate resin (B) was particle-dispersed in island shapes in the polylactic acid resin (A) in the range from the surface of the molded article to a depth of 5 μm and the lengths of the cross sections of the dispersed particles were 0.1 μm or more. On the other hand, evaluated as poor (P) was the case where no island-shaped dispersion was observed or the lengths of the cross sections of the dispersed particles were less than 0.1 μm.

The materials used in below-described Examples and Comparative Examples are as follows. The MFR values listed below are each accompanied by the measurement temperature given in parentheses.

[Polylactic Acid Resin (A)]

PLA-1: Manufactured by NatureWorks LLC, trade name: "4032D," weight average molecular weight (MW): 180,000, melting point: 170° C., MFR (240° C.) : 18 g/10 min PLA-2: Manufactured by NatureWorks LLC, trade name: "6201D," weight average molecular weight (MW): 160,000, melting point: 168° C., MFR (240° C.) : 48 g/10 min PLA-3: Manufactured by NatureWorks LLC, trade name: "6251D," weight average molecular weight (MW): 100,000, melting point: 168° C., MFR (240° C.) : 177 g/10 min

[Polycarbonate Resin (B)]

PC-1: Manufactured by Sumitomo Dow Ltd., trade name: "1200-30, " intrinsic viscosity: 0.44, MFR (240° C.) : 5 g/10 min PC-2: Manufactured by Sumitomo Dow Ltd., trade name: "1080DVD," intrinsic viscosity: 0.38, MFR (240° C.): 13 g/10 min PC-3: Manufactured by Sumitomo Dow Ltd., trade name: "200-13," intrinsic viscosity: 0.49, MFR (240° C.): 1.6 g/10 min PC-4: Manufactured by Sumitomo Dow Ltd., trade name: "200-3, " intrinsic viscosity: 0.53, MFR (240° C.) : 0.4 g/10 min

[Methyl Methacrylate Copolymer (C)]

MMA-1: Methyl methacrylate/butyl acrylate copolymer (manufactured by Mitsubishi Rayon Co., Ltd., trade name: "Metablene P-531A"), weight average molecular weight (MW)=2,240,000

MMA-2: Methyl methacrylate/butyl acrylate copolymer (manufactured by Mitsubishi Rayon Co., Ltd., trade name: "Metablene P-551A"), weight average molecular weight (MW)=960,000

MMA-3: Methyl methacrylate/butyl acrylate copolymer (manufactured by Mitsubishi Rayon Co., Ltd., trade name: "Metablene P-570A"), weight average molecular weight (MW)=200,000

[Epoxy Group-containing Additive (D)]

BF: Ethylene/glycidyl methacrylate copolymer (manufactured by Sumitomo Chemical Co., Ltd., trade name: "Bondfast 2C")

MD: Ethylene/glycidyl methacrylate copolymer-g-polymethyl methacrylate (manufactured by NOF Corp., trade name: "Modiper A4200")

[Reactive Compound (E)]

CDI: N,N'-di-2,6-diisopropylphenylcarbodiimide (manufactured by Bayer AG, trade name: "Stabaczole I")

EPX: p-t-Butylphenyl glycidyl ether (manufactured by Nagase Kasei Co., Ltd., trade name: "Denacole EX-146")

OXZ: 2,2'-m-phenylenebis(2-oxazoline) (manufactured by Tokyo Chemical Industry Co., Ltd.)

[Core-shell Graft Copolymer (F)]

CS-C: Butadiene rubber (manufactured by Mitsubishi Rayon Co., Ltd., trade name: "Metablene C-223A")

CS-S: Silicone/acrylic rubber (manufactured by Mitsubishi Rayon Co., Ltd., trade name: "Metablene S-2001")

Example 1

A resin blended material was prepared by mixing the polylactic acid resin PLA-1 and the polycarbonate resin PC-1 in a mass ratio of 52/48. A mixture was prepared by adding 3 parts by mass of the methyl methacrylate copolymer MMA-1 to 100 parts by mass of the resin blended material. The mixture was melt-kneaded by using a double screw extruder, Model PCM-30 (die with 3 holes of 4 mm in diameter) manufactured by Ikegai Corp., under the conditions of an extrusion temperature of 240° C., a screw rotation number of 150 rpm and a discharge rate of 100 g/min. The melt-kneaded resin was extruded into strands, the strands were cooled in a water bath, and thereafter cut into pellets with a pelletizer to yield resin composition pellets.

The obtained pellets were dried, and thereafter injection molded by using an injection molding machine, Model IS-80G, manufactured by Toshiba Machine Co., Ltd., under the conditions of a cylinder temperature set at 220° C., an injection pressure of 100 MPa and an injection time of 15 seconds. Various physical properties of the obtained molded article were evaluated. In this case, the die temperature was set at 75° C. and the cooling time was set at 30 seconds.

Examples 2 to 16 and Comparative Examples 1 to 6

The types and the amounts of the polylactic acid resin (A), polycarbonate resin (B), methyl methacrylate copolymer (C), epoxy group-containing additive (D), reactive compound (E) and core-shell graft copolymer (F) were respectively altered as shown in Table 1. Otherwise in the same manner as in Example 1, resin compositions were obtained. The resin compositions were injection molded to yield molded articles. Various physical properties of the obtained molded articles were evaluated.

The results for Examples 1 to 16 and Comparative Examples 1 to 5 are shown in Table 1.

In Examples 13 to 16, the addition of the core-shell graft copolymer (F) improved the impact resistance.

TABLE 1

| | | Materials for resin composition | | | | | | | | | | | |
|---|---|---|---|---|---|---|---|---|---|---|---|---|---|
| | | Polylactic acid resin (A) | | Polycarbonate resin (B) | | | Methyl methacrylate copolymer (C) | | Epoxy group-containing additive (D) | | Reactive compound (E) | | Core-shell graft copolymer (F) | |
| | | Type | Parts by mass | Type | Parts by mass | MFR ratio (A/B) | Type | Parts by mass | Type | Parts by mass | Type | Parts by mass | Type | Parts by mass |
| Examples | 1 | PLA-1 | 52 | PC-1 | 48 | 3.6 | MMA-1 | 3 | — | — | — | — | — | — |
| | 2 | PLA-1 | 52 | PC-1 | 48 | 3.6 | MMA-1 | 5 | — | — | — | — | — | — |
| | 3 | PLA-1 | 70 | PC-1 | 30 | 3.6 | MMA-1 | 3 | — | — | — | — | — | — |
| | 4 | PLA-1 | 42 | PC-1 | 58 | 3.6 | MMA-1 | 3 | — | — | — | — | — | — |
| | 5 | PLA-1 | 52 | PC-1 | 48 | 3.6 | MMA-2 | 5 | — | — | — | — | — | — |
| | 6 | PLA-1 | 55 | PC-1 | 45 | 3.6 | MMA-1 | 3 | BF | 5 | — | — | — | — |
| | 7 | PLA-1 | 55 | PC-1 | 45 | 3.6 | MMA-1 | 3 | MD | 5 | — | — | — | — |
| | 8 | PLA-1 | 55 | PC-1 | 45 | 3.6 | MMA-1 | 3 | MD | 10 | — | — | — | — |
| | 9 | PLA-1 | 55 | PC-2 | 45 | 1.4 | MMA-1 | 3 | MD | 5 | — | — | — | — |
| | 10 | PLA-1 | 55 | PC-1 | 45 | 3.6 | MMA-1 | 3 | MD | 5 | CDI | 1.5 | — | — |
| | 11 | PLA-1 | 55 | PC-1 | 45 | 3.6 | MMA-1 | 3 | MD | 5 | EPX | 1.5 | — | — |
| | 12 | PLA-1 | 55 | PC-1 | 45 | 3.6 | MMA-1 | 3 | MD | 5 | OXZ | 1.5 | — | — |
| | 13 | PLA-1 | 60 | PC-1 | 40 | 3.6 | MMA-1 | 3 | MD | 10 | — | — | CS-C | 2 |
| | 14 | PLA-1 | 60 | PC-1 | 40 | 3.6 | MMA-1 | 3 | MD | 10 | — | — | CS-S | 2 |
| | 15 | PLA-1 | 60 | PC-1 | 40 | 3.6 | MMA-1 | 3 | MD | 10 | CDI | 1.5 | CS-S | 2 |
| | 16 | PLA-1 | 60 | PC-2 | 40 | 1.4 | MMA-1 | 3 | MD | 10 | CDI | 1.5 | CS-S | 2 |
| Comparative Examples | 1 | PLA-1 | 50 | PC-1 | 50 | 3.6 | — | — | — | — | — | — | — | — |
| | 2 | PLA-1 | 55 | PC-1 | 45 | 3.6 | MMA-3 | 3 | MD | 5 | — | — | — | — |
| | 3 | PLA-1 | 90 | PC-1 | 10 | 3.6 | MMA-1 | 3 | — | — | — | — | — | — |
| | 4 | PLA-1 | 50 | PC-1 | 50 | 3.6 | MMA-1 | 30 | — | — | — | — | — | — |
| | 5 | PLA-2 | 55 | PC-3 | 45 | 30 | MMA-1 | 3 | MD | 5 | — | — | — | — |

| | | Flexural strength MPa | Flexural modulus GPa | Izod impact strength J/m | Deflection temperature under load °C. | Humidity-heat resistance Flexural strength retention rate % | Exterior appearance |
|---|---|---|---|---|---|---|---|
| Examples | 1 | 107 | 3.1 | 75 | 108 | 10 | G |
| | 2 | 104 | 3.0 | 78 | 106 | 9 | G |
| | 3 | 105 | 3.4 | 68 | 80 | 5 | G |
| | 4 | 108 | 3.2 | 95 | 115 | 30 | G |
| | 5 | 103 | 3.0 | 77 | 105 | 10 | G |
| | 6 | 95 | 2.9 | 135 | 102 | 35 | G |
| | 7 | 98 | 2.9 | 186 | 103 | 40 | G |
| | 8 | 95 | 2.8 | 334 | 100 | 48 | G |
| | 9 | 98 | 2.9 | 187 | 105 | 38 | G |
| | 10 | 98 | 2.9 | 235 | 106 | 100 | G |
| | 11 | 98 | 2.8 | 236 | 104 | 95 | G |
| | 12 | 98 | 2.9 | 228 | 104 | 96 | G |
| | 13 | 95 | 2.7 | 526 | 95 | 46 | G |
| | 14 | 95 | 2.6 | 623 | 95 | 47 | G |
| | 15 | 96 | 2.7 | 645 | 98 | 100 | G |
| | 16 | 94 | 2.7 | 532 | 98 | 100 | G |
| Comparative Examples | 1 | 109 | 3.4 | 71 | 102 | 11 | P |
| | 2 | 98 | 2.9 | 148 | 85 | 46 | P |
| | 3 | 108 | 3.5 | 30 | 57 | 5 | G |
| | 4 | 78 | 2.5 | 150 | 57 | 9 | G |
| | 5 | 90 | 2.8 | 48 | 62 | 37 | G |

As can be seen from Table 1, in each of Examples 1 to 16, the methyl methacrylate copolymer (C) was included and the MFR ratio ($MFR_A/MFR_B$) was less than 10, and consequently Examples 1 to 16 all had excellent physical properties; in each of Examples 1 to 16, the inclusion of the methyl methacrylate copolymer (C) therein resulted in excellent exterior appearance.

In Examples 10 to 12, and 15 and 16, the addition of the reactive compound (E) provided the blocking of the terminal groups in the polylactic acid resin (A), and resulted in excellent humidity-heat resistance.

On the contrary, in each of Comparative Examples 1 and 2 the MFR ratio ($MFR_A/MFR_B$) was less than 10, but in Comparative Example 1 the methyl methacrylate copolymer (C) was not included and in Comparative Example 2 the weight average molecular weight of the copolymer (C) was less than 500,000, and hence in each of Comparative Examples 1 and 2 the exterior appearance was poor although the physical properties other than the exterior appearance were excellent.

In Comparative Example 3, the MFR ratio was less than 10, but the mass ratio (A/B) between the polylactic acid resin (A)

and the polycarbonate resin (B) was 90/10, and hence the impact resistance and the heat resistance were poor.

In Comparative Example 4, the content of the copolymer (C) was too large, and hence the heat resistance was poor.

In Comparative Example 5, the methyl methacrylate copolymer (C) was included and the MFR ratio was 10 or more, and hence the impact resistance and the heat resistance were poor.

Example 17

PLA-2 was used as the polylactic acid resin (A) and PC-3 was used as the polycarbonate resin (B). The methyl methacrylate copolymer (C) was not used. By using a double screw extruder, Model PCM-30 (die with 3 holes of 4 mm in diameter) manufactured by Ikegai Corp., at an extrusion temperature of 240° C., 55 parts by mass of PLA-2 and 45 parts by mass of PC-3 were mixed together, the mixed resin was extruded into strands, and the strands were cooled in a water bath and thereafter cut into pellets with a pelletizer to yield resin composition pellets.

The obtained pellets were dried, and thereafter injection molded by using an injection molding machine, Model IS-80G, manufactured by Toshiba Machine Co., Ltd., under the conditions of a cylinder temperature set at 220° C., an injection pressure of 100 MPa and an injection time of 15 seconds. Various physical properties of the obtained molded article were evaluated. In this case, the die temperature was set at 75° C. and the cooling time was set at 30 seconds.

Examples 18-32 and Comparative Examples 6 to 11

The types and the amounts of the polylactic acid resin (A), polycarbonate resin (B), epoxy group-containing additive (D) and reactive compound (E) were respectively altered as shown in Table 2. Otherwise in the same manner as in Example 17, resin compositions were obtained. The resin compositions were injection molded to yield molded articles. Various physical properties of the obtained molded articles were evaluated.

The results for Examples 17 to 32 and Comparative Examples 6 to 11 are shown in Table 2.

TABLE 2

| | | Materials for resin composition | | | | | | | | |
|---|---|---|---|---|---|---|---|---|---|---|
| | | Polylactic acid resin (A) | | Polycarbonate resin (B) | | | Epoxy group-containing additive (D) | | Reactive compound (E) | | Flexural strength (MPa) | Flexural modulus (GPa) |
| | | Type | Parts by mass | Type | Parts by mass | MFR ratio (A/B) | Type | Parts by mass | Type | Parts by mass | | |
| Examples | 17 | PLA-2 | 55 | PC-3 | 45 | 30 | — | — | — | — | 95 | 2.9 |
| | 18 | PLA-2 | 70 | PC-3 | 30 | 30 | — | — | — | — | 102 | 3.4 |
| | 19 | PLA-2 | 42 | PC-3 | 58 | 30 | — | — | — | — | 95 | 2.8 |
| | 20 | PLA-2 | 53 | PC-3 | 47 | 30 | BF | 5 | — | — | 89 | 2.8 |
| | 21 | PLA-2 | 53 | PC-3 | 47 | 30 | MD | 5 | — | — | 90 | 2.8 |
| | 22 | PLA-2 | 55 | PC-3 | 45 | 30 | MD | 11 | — | — | 90 | 2.7 |
| | 23 | PLA-2 | 53 | PC-4 | 47 | 120 | MD | 5 | — | — | 88 | 2.7 |
| | 24 | PLA-3 | 53 | PC-3 | 47 | 111 | MD | 5 | — | — | 84 | 2.6 |
| | 25 | PLA-1 | 53 | PC-3 | 47 | 11 | MD | 5 | — | — | 95 | 2.9 |
| | 26 | PLA-1 | 53 | PC-4 | 47 | 45 | MD | 5 | — | — | 92 | 2.7 |
| | 27 | PLA-2 | 55 | PC-3 | 45 | 30 | — | — | CDI | 1.5 | 88 | 2.9 |
| | 28 | PLA-2 | 55 | PC-3 | 45 | 30 | — | — | EPX | 1.5 | 89 | 2.7 |
| | 29 | PLA-2 | 55 | PC-3 | 45 | 30 | — | — | OXZ | 1.5 | 87 | 2.6 |
| | 30 | PLA-2 | 58 | PC-3 | 42 | 30 | MD | 5 | CDI | 1.5 | 89 | 2.7 |
| | 31 | PLA-3 | 53 | PC-3 | 47 | 111 | MD | 5 | CDI | 1.5 | 87 | 2.6 |
| | 32 | PLA-1 | 53 | PC-3 | 47 | 11 | MD | 5 | CDI | 1.5 | 92 | 2.8 |
| Comparative Examples | 6 | PLA-1 | 55 | PC-1 | 45 | 3.6 | — | — | — | — | 102 | 3.1 |
| | 7 | PLA-1 | 70 | PC-1 | 30 | 3.6 | — | — | — | — | 107 | 3.4 |
| | 8 | PLA-1 | 53 | PC-1 | 47 | 3.6 | MD | 5 | — | — | 95 | 2.9 |
| | 9 | PLA-1 | 53 | PC-2 | 47 | 1.4 | MD | 5 | — | — | 95 | 2.9 |
| | 10 | PLA-3 | 55 | PC-2 | 45 | 3.7 | MD | 5 | — | — | 88 | 2.8 |
| | 11 | PLA-3 | 90 | PC-3 | 10 | 30 | — | — | — | — | 107 | 3.5 |

| | | Izod impact strength (J/m) | Deflection temperature under load (° C.) | Humidity-heat resistance Flexural strength retention rate (%) | Observation of dispersed particles of resin (B) | Exterior appearance |
|---|---|---|---|---|---|---|
| Examples | 17 | 52 | 78 | 10 | G | G |
| | 18 | 42 | 60 | 19 | G | G |
| | 19 | 62 | 95 | 25 | G | G |
| | 20 | 55 | 75 | 35 | G | G |
| | 21 | 58 | 75 | 37 | G | G |
| | 22 | 64 | 73 | 45 | G | G |
| | 23 | 55 | 72 | 37 | G | G |
| | 24 | 57 | 68 | 28 | G | G |
| | 25 | 90 | 82 | 50 | G | G |
| | 26 | 84 | 76 | 48 | G | G |

TABLE 2-continued

|  |  |  |  |  |  |  |
|---|---|---|---|---|---|---|
|  | 27 | 58 | 75 | 100 | G | G |
|  | 28 | 56 | 73 | 95 | G | G |
|  | 29 | 56 | 72 | 95 | G | G |
|  | 30 | 70 | 73 | 100 | G | G |
|  | 31 | 60 | 65 | 100 | G | G |
|  | 32 | 94 | 80 | 100 | G | G |
| Comparative | 6 | 71 | 95 | 11 | P | P |
| Examples | 7 | 48 | 65 | 9 | P | P |
|  | 8 | 105 | 85 | 46 | P | P |
|  | 9 | 103 | 83 | 47 | P | P |
|  | 10 | 58 | 75 | 36 | P | P |
|  | 11 | 30 | 57 | 5 | G | G |

As can be seen from Table 2, in each of Examples 17 to 32, the methyl methacrylate copolymer (C) was not included and the MFR ratio ($MFR_A/MFR_B$) was 10 or more, and consequently Examples 17 to 32 were all excellent in exterior appearance; on the contrary, in each of Comparative Examples 6 to 10, the methyl methacrylate copolymer (C) was not included and the MFR ratio was less than 10, and hence the exterior appearance was poor.

In Examples 27 to 32, the addition of the reactive compound (E) provided the blocking of the terminal groups in the polylactic acid resin (A), and resulted in excellent humidity-heat resistance.

In Comparative Example 11, the methyl methacrylate copolymer (C) was not included and the MFR ratio was 10 or more, but the mass ratio (A/B) between the polylactic acid resin (A) and the polycarbonate resin (B) was 90/10, and hence the impact resistance and the heat resistance were poor.

Figure 1:
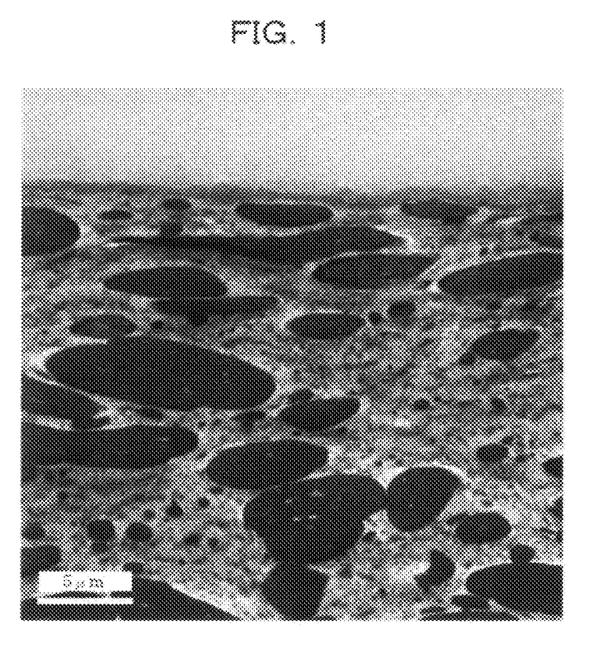
FIG. 1 is a view presenting an enlarged image of the cross section of the surface and a portion in the vicinity of the surface of the molded article of Example 21.
Figure 2:
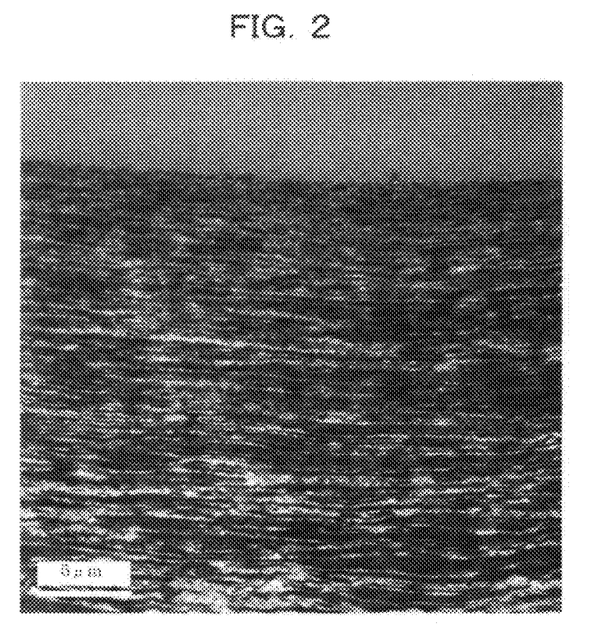
FIG. 2 is a view presenting an enlarged image of the cross section of the surface and a portion in the vicinity of the surface of the molded article of Comparative Example 8.

For Example 21 and Comparative Example 8, FIGS. 1 and 2 respectively show the images obtained by photographing, with a transmission electron microscope, the cross sections of the molded articles of Examples 21 and Comparative Example 8 each in a range from the surface of the molded article to a depth of about 20 μm. In these images, the deep color portions are associated with the polycarbonate resin (B) and the pale color portions are associated with the polylactic acid resin (A).

In FIG. 1 showing the image of Example 21, in the range from the surface of the molded article to a depth of 5 μm, the polycarbonate resin (B) was particle-dispersed in island shapes in the polylactic acid resin (A) and the lengths of the cross sections of the dispersed particles were 0.1 μm or more.

On the other hand, in FIG. 2 showing the image of Comparative Example 8, in the range from the surface of the molded article to a depth of 5 μm, the polycarbonate resin (B) was far from being particle-dispersed in island shapes in the polylactic acid resin (A), and the polylactic acid resin (A) and the polycarbonate resin (B) were found to form nano-dispersion structures. On going further deeper in the depth direction, the polylactic acid resin (A) and the polycarbonate resin (B) were found to gradually form such a dispersion state in which the resins (A) and (B) were discernible from each other, namely, a micro-dispersion structure.

The phenomenon of the exterior appearance failure probably involves the nano-dispersion layer and the micro-dispersion layer beneath the nano-dispersion layer. Specifically, in the nano-dispersion layer, the size of the dispersed particles is sufficiently smaller than the wavelength of light, and hence the nano-dispersion layer is light-transmissive to result in a transparent appearance; however, on going into the inner layers, the nano-dispersion collapses into the micro-dispersion and hence light undergoes diffuse reflection to cause an opaque appearance. Such a non-uniform structure probably causes a phenomenon to be visually recognized as the exterior appearance failure. On the other hand, in the case of a molded article satisfactory in exterior appearance, the dispersed particles of the polycarbonate resin (B) having the lengths of the cross sections of the dispersed particles of 0.1 μm or more are present in the surface layer portion, and hence it is inferred that light undergoes diffuse reflection in the surface layer portion to make the surface layer portion opaque and thus the exterior appearance is visually recognized as satisfactory.

The invention claimed is:

1. A molded article produced by molding a resin composition consisting essentially of a polylactic acid resin (A) and a polycarbonate resin (B), wherein:
   the mass ratio (A/B) between the polylactic acid resin (A) and the polycarbonate resin (B) in the resin composition is 40/60 to 80/20;
   a methyl methacrylate copolymer (C) is not included in the resin composition;
   the ratio ($MFR_A/MFR_B$) between the melt flow rate ($MFR_A$) of the polylactic acid resin (A) and the melt flow rate ($MFR_B$) of the polycarbonate resin (B) at 240° C. under a load of 21.2 N is 20 to 600;
   the polycarbonate resin (B) is particle-dispersed in island shapes in the polylactic acid resin (A), in a range from a surface of the molded article to a depth of 5 μm; and
   lengths of cross sections of dispersed particles observed in a cross section of the molded article are 0.1 μm or more.

2. The molded article according to claim 1, wherein the resin composition constituting the molded article further consists essentially of an epoxy group-containing additive (D) and the content of the epoxy group-containing additive (D) is 0.5 to 30 parts by mass in relation to 100 parts by mass of the total of the polylactic acid resin (A) and the polycarbonate resin (B).

3. The molded article according to claim 1, wherein the resin composition constituting the molded article further consists essentially of a reactive compound (E) that comprises at least one or more units of a functional group selected from the group consisting of carbodiimide, epoxy and oxazoline, and the content of the reactive compound (E) is 0.01 to 5 parts by mass in relation to 100 parts by mass of the total of the polylactic acid resin (A) and the polycarbonate resin (B).

* * * * *